United States Patent [19]

Zumwalt

[11] 4,056,211
[45] Nov. 1, 1977

[54] SUPPORT AND RETENTION LINER GASKET

[75] Inventor: Homer Zumwalt, Galesburg, Ill.

[73] Assignee: Rockwell International Corporation, Pittsburgh, Pa.

[21] Appl. No.: 719,045

[22] Filed: Aug. 30, 1976

[51] Int. Cl.² ............................................. B65D 25/18
[52] U.S. Cl. .................................. 220/9 G; 49/501; 312/296; 403/288
[58] Field of Search ............ 312/214, 296; 220/63 R, 220/9 G, DIG. 3; 403/288; 49/478, 501

[56] References Cited

U.S. PATENT DOCUMENTS

| | | | |
|---|---|---|---|
| 2,786,241 | 3/1957 | Garvey et al. | 49/498 |
| 3,078,003 | 2/1963 | Kesling | 312/214 |
| 3,238,573 | 3/1966 | Pease, Jr. | 49/478 |
| 3,378,957 | 4/1968 | Fretise | 49/487 |
| 3,380,615 | 4/1968 | Kessler | 220/9 G |
| 3,633,783 | 1/1972 | Aue | 220/9 G |

FOREIGN PATENT DOCUMENTS

201,645  7/1954  Australia ........................... 220/9 G

*Primary Examiner*—Paul R. Gilliam
*Assistant Examiner*—Alex Grosz

[57] ABSTRACT

A one piece extruded elastomeric support and retention liner gasket for resiliently and sealingly mounting a plastic sheet food liner to the cabinet in a refrigerator or freezer includes a barbed lower body which is pressed into an upwardly opening J-shaped channel formed adjacent the inner rim of the cabinet, the gasket including an intermediate inwardly projecting arm and a spaced resiliently supported upper head section defining with the arm an inwardly opening peripheral groove for receiving the outer peripheral flange of the food liner, the arrangement being such that as the gasket is pressed into the J-channel the arm engages the short leg of the J-channel so as to be upwardly deflected thereby narrowing the slot and the head section engages the long leg of the J-channel so as to downwardly deflect thereby also narrowing the slot whereby the flange is resiliently compressively gripped in assembly therebetween.

3 Claims, 5 Drawing Figures

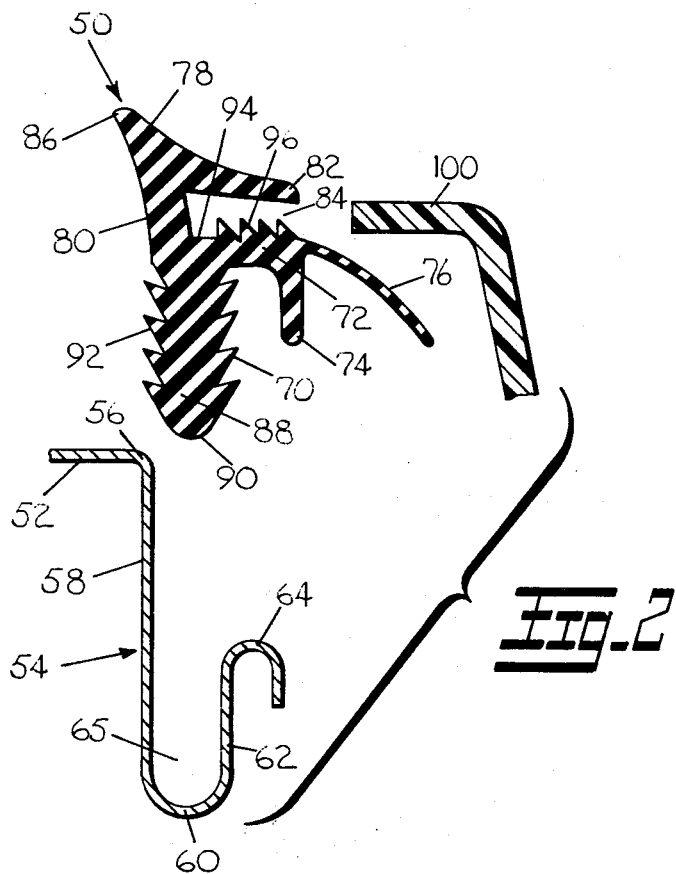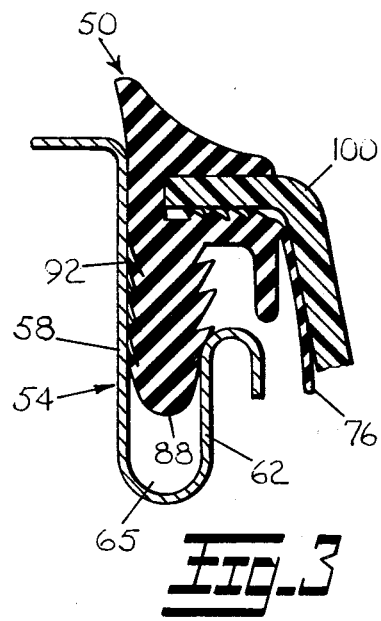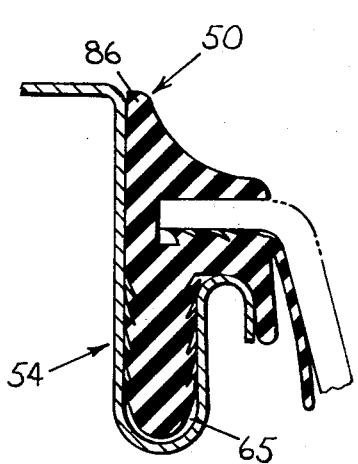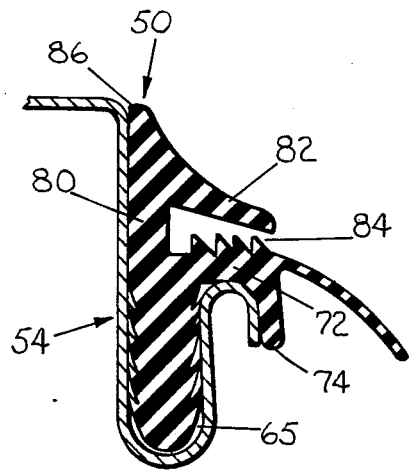

SUPPORT AND RETENTION LINER GASKET

BACKGROUND OF THE INVENTION

The present invention relates to refrigerated cabinet constructions and, in particular, to a support and retention liner gasket for mounting a plastic sheet food liner to the sheet metal cabinet of a refrigerator or freezer.

Currently, many refrigeration applications, such as refrigerators and freezers, employ a deep drawn plastic sheet food liner defining a food storage space that is mounted at a peripheral flange thereof to the frontal rim of the cabinet. This open ended cavity is opened and closed by means of a hinged door to gain access to the food storage space. Typically, such constructions employ a mounting arrangement wherein the food liner flange is snapped into a groove defined between the frontal rim and a parallel rearwardly spaced rim. The aforementioned rims have a frontal opening less than the dimension of the generally recentangular flange on the food liner. The rims also define an inwardly opening groove slightly larger than the dimensions of the flange.

Inasmuch as the side walls of such food liner are flexible, the long sides thereof may be inwardly flexed. This causes the short walls to bow slightly thereby presenting temporarily a lesser width than the opening and allowing the four corners thereof to be positioned adjacent the groove. When the walls are released the flange expands to its original shape and enters the groove so as to be fixedly captured therewithin. Spring clips are provided in the groove to resiliently mount the liner and take up clearance relationships which would otherwise exist.

While this normally produces a satisfactory mounting relationship, owing to the fact that the plastic sheet liner is extremely brittle, in an altogether unsatisfactory number of cases the inward flexing of the food liner causes the side walls thereof to crack. This can occur for instance when the flexing is excessive or material irregularities cause localized brittleness. In any event, these factors, which are difficult to control in mass production, result in increased production costs.

OBJECT OF THE INVENTION

The present invention provides a mounting construction for the plastic sheet food liner that obviates the above difficulties by providing an arrangement wherein flexing of the side walls is not required to achieve the mounting relationships and the mere pressing of a peripheral support and liner gasket into a channel resiliently mounts the food liner in secured sealed relationship without inducing any flexing stresses to the flanges and the side walls. More particularly, the refrigerated cabinet is herein provided with a frontal rim having a slightly larger frontal opening than the flange of the food liner, in constrast to the aforementioned conventional constructions where the opposite relationship is present. A J-channel is formed adjacent the inner edge of the rim and defines an upwardly or frontal by opening peripheral groove between the inner short wall and the outer long wall of the J-channel. A one piece elastomeric gasket adapted to be peripherally received in the channel includes a body with a base having a free dimension slightly larger than the width of the groove in the channel so that, upon insertion of the body into the channel, the base is resiliently compressively gripped therein. An outwardly projecting intermediate arm on the body includes a downwardly extending finger, the finger, the arm and the body defining therebetween a downwardly or rearwardly opening groove having a lesser width than the width of a reversely turned rim at the short leg of the J-channel. Accordingly, as the body is inserted into the channel the spreading of the finger relative to the body upwardly deflects the arm. The body further includes a head section flexibly connected to the body adjacent the arm and the leg. The head includes an inwardly projecting nose section in spaced relationship to the arm. The nose section and the arm define therebetween an inwardly opening slot or groove, substantially parallel to the plane of the rim, that receives the flange of the food liner. The head section further includes a rear surface having a free dimension greater than the width of the channel. Upon insertion, the rear surface engages the long leg of the J-channel and downwardly deflects the nose section. The aforementioned flexing of the arm and the nose section narrows the width of the slot such that the flange is compressively resiliently gripped without inducing any stresses in the side wall thereby providing a stress free mounting for the food liner.

The above and other features of the present invention will be apparent to those skilled in the art upon reading the following detailed description, reference being made to the accompanying drawings showing a preferred embodiment in which:

DESCRIPTION OF THE DRAWINGS

FIG. 2 is a representative cross sectional view showing the gasket, the liner and the cabinet in spaced unassembled relationship;

FIG. 3 is a representative cross sectional view showing the flange of the liner received in the slot of the gasket, with the barbed end partially inserted into the cabinet J-channel;

FIG. 4 is a representative cross sectional view showing gasket fully inserted into the J-channel with the flange shown in dashed lines; and FIG. 5 is a cross sectional view of the gasket fully inserted into the channel with the flange removed showing the biasing effect of the arm and head sections engaging portions of the J-channel.

DESCRIPTION OF THE PREFERRED EMBODIMENT

Figure 1:
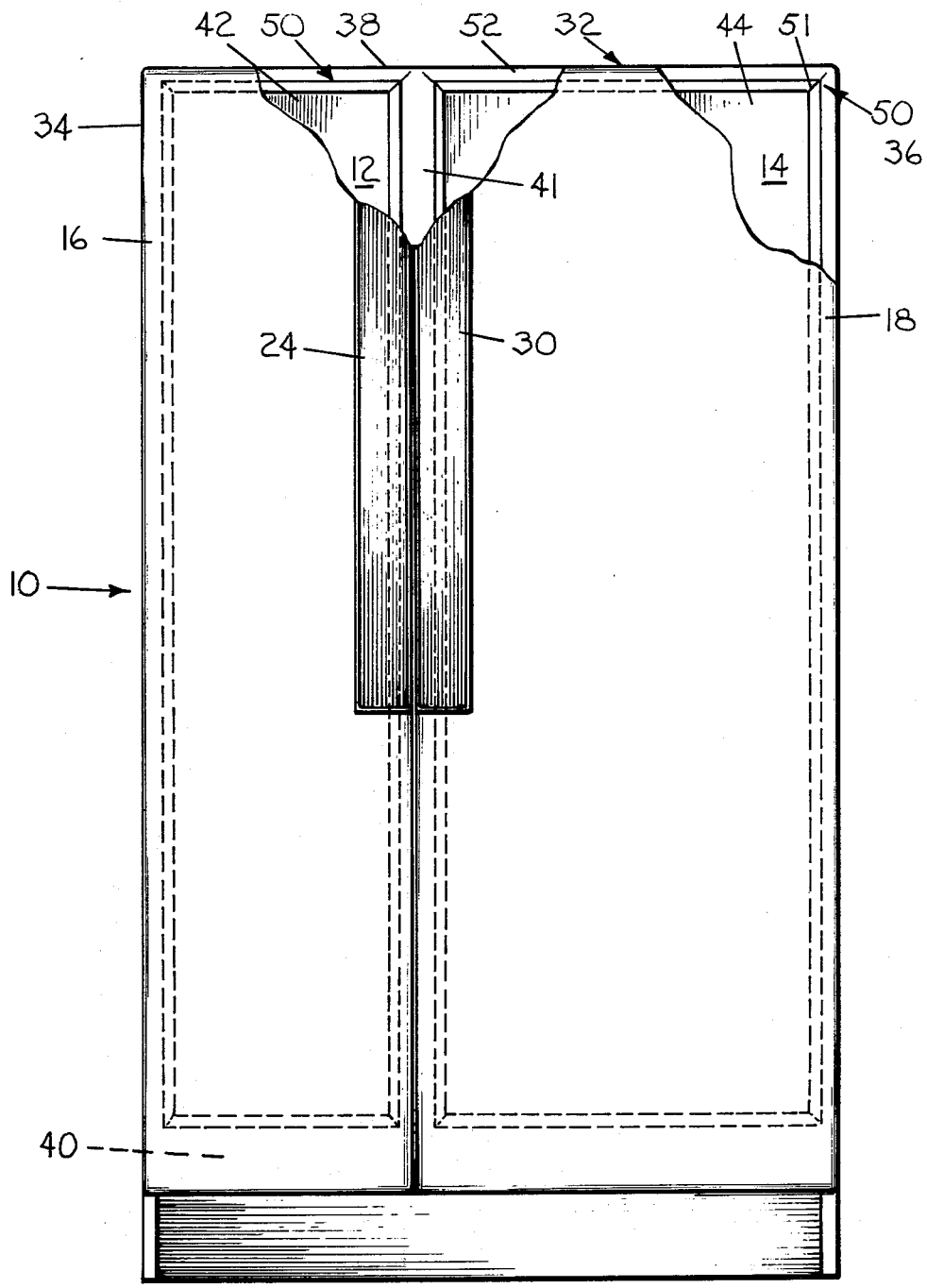
FIG. 1 is a front view of a household refrigerator incorporating a plastic food liner mounted on the refrigerator cabinet by a support and retention liner gasket made in accordance with the present invention, portions of the refrigerator doors being broken away to show details of construction.

Referring to FIG. 1 there is shown a two-door side-by-side household refrigerator 10 wherein a freezer compartment 12 and a refrigerator compartment 14 are respectively selectively closed by a freezer door 16 and refrigerator door 18. The freezer door 16 is pivotally mounted on an upper hinge and a lower hinge for pivotal movement by means of a handle 24 between an open and closed position. The refrigerator door 18 is mounted on an upper hinge and a lower hinge for pivotal movement by means of a handle 30 between an open and closed position.

The present invention will be described with reference to a side-by-side household refrigerator, however, it will be readily apparent that the invention is equally adaptable to other refrigerated cabinet constructions, domestic as well as commercial, including freezers, single door, double door and triple door side-by-sides, or top mount refrigerators.

More particularly, the refrigerator 10 comprises a sheet metal cabinet 32 having side walls 34, 36 vertically disposed with respect to a top wall 38. The side walls 34, 36 are joined at the lower ends by a base plate 40 and intermediately spaced by a vertical divider wall 41. The walls define a generally recentangular enclosure in which a freezer compartment food liner 42 and a refrigerator compartment food liner 44 are mounted by means of a support and retention liner gasket representatively indicated for each compartment by the numeral 50.

The walls 34, 36, 38 and 40, 41 include planar front surfaces or rims representatively shown as numeral 52. The rims 52 circumscribe the frontal access opening for the individual compartments. The rims are substantially coextensive with the side edges of each compartment and may be interrupted at the corners thereof to provide for the mitered corners 51 of the gaskets 50. The cross section of the rim in the immediate vicinity of the associated food liner is, however, identical and the following description will proceed with reference to a representative rim and associated channel cross section and its interaction with the food liner and the gasket.

Referring now to FIGS. 2 through 5, a J-channel 54 is formed adjacent the inner edge 56 of the rim 52. The J-channel 54 includes a long leg or wall 58 extending rearwardly from the edge 56 perpendicular to the rim 52, a U-shaped peripherally turned base section 60 terminating with an upwardly extending short leg or wall 62 which terminates at its upper edge with the reversely turned U-shaped lip 64. The long wall 58 and the short wall 62 define therebetween an upwardly opening groove 65 adapted to receive the base section of the gasket 50 as hereinafter described. The lip 64 defines a curved surface having a predetermined diameter or thickness. As previously mentioned, the J-channel 54 may be continuous about the entire periphery, interrupted at the corners to allow sufficient room for the mitered joint or interrupted at spaced locations along the sides thereof. In any event, however, there should be sufficient channel length to firmly peripherally support the gasket in assembly.

The gasket 50 is formed from an elastomeric material such as rubber having suitable resiliency and properties for operation in a refrigerated environment.

The gasket may be molded in a single piece with the individual gaskets being appropriately sized for the respective compartments or may be extruded in a continuous length and mitered to conform to the shapes of the representative compartments.

The gasket 50 generally comprises a barbed base section 70, an inwardly projecting flexible arm 72 inwardly terminating with a downwardly curved finger 74 to which a thin deflectable liner engaging lip 76 is attached, and a head section 78 including a thin neck 80 connected to the base 70 adjacent the arm 72 having an inwardly projecting flexible nose 82 in frontally spaced relationship to the front surface of the arm 72 and defining therebetween a liner flange receiving slot 84. The head section 78 includes an outwardly projecting ledge or rear portion 86 adjacent the upper corner thereof. The base 70 includes a root portion 88 having a convex tip 90 and a plurality of longitudinal flexible barbs 92 formed on either side thereof. The thickness of the root portion 88 is slightly less than the width of the upwardly opening groove 65. However, the thickness of the base 90 including the barbs 92 is slightly greater than the thickness of the groove 65. The heighth of the base 70 as measured from the lower surface of the arm 72 to the end of the tip 90, is slightly less than the depth of the groove 65 measured from the rim 64 to the base 60. In this regard, however, depending on the compressability of the gasket 50 the depth may be the same or slightly less than the base 70.

Thus as shown in FIG. 3, when the gasket 50 is partially inserted into the groove 65, the root 88 penetrates the former with the barbs 92 deflecting inwardly and compressively frictionally engaging the sides of the walls 58, 62.

The arm 72 includes a generally planar upper surface 94 having a plurality of flexible ribs 96 formed thereon. The upper surface 94 is adapted to be substantially parallelly disposed with respect to the plane of the rim 52. The finger 74 is a relatively thin cross sectional arcuate member with the lower surface thereof and the arm 72 being generally U-shaped and having a width slightly less than the diameter of the lip 64. Accordingly as shown in FIG. 5, when the gasket 50 is fully inserted into the groove 65, the finger 74 and arm 72 are biased slightly upwardly so as to narrow the nominal dimension of the slot 84. The narrowing of the slot would be further increased by increased penetration of the base section into the groove 65. Continuing with FIG. 5, when the gasket 50 is fully inserted into the groove 65, the ledge 86, which in the free state extends beyond the plane of the side wall 58, engages the inner surface of the wall 58 and the resultant inward deflection pivots the nose section 82 downwardly about the neck 80 so as to further decrease the width of the slot 84. Depending on the interference between the ledge 86 and the side wall 58, the amount of narrowing and resultant compression on the flange of the liner can be controlled. Accordingly, the amount of compressability on the liner flange can be maintained sufficient to sealing grip the flange while resiliently supporting the same in stress free relationship.

Referring to FIGS. 2 and 3, each liner includes four side walls terminating with an end wall defining a combination with the associated door of a food storage space which when coupled with conventional shelves and support members is suitable for containing the refrigerated articles therein. The liner terminates with an outwardly extending flange 100 having a generally rectangular frontal area smaller than the frontal area circumscribed by the edge 56 and substantially the same as or less than the dimensions of the groove 84 when the gasket 50 is fully received in the channel. The liners are formed as a deep drawn plastic sheet and have a substantially constant thickness flange. However, the side walls of the flanges are somewhat brittle and can crack if excessive stresses are established therein. In the present invention these are eliminated by the resilient mounting provided by the gasket 50. More particularly to assemble the liner on the cainet, the gasket 50 is disposed around the periphery of the liner with the flange 100 entering the slot 84 as shown in FIGS. 3 and 4. As shown in FIG. 3 the flange 100 is lightly compressively gripped between the nose section 82 and the arm 72 with the flexible ribs 96 lightly compressively engaging the rearward surface of the flange 100. The gasket 54 is then oriented with respect to the J-channel 64 and the root portion 88 pressed into the groove 65. As the gasket 50 is more fully inserted into the groove 65, the ledge 86 engages the side wall 58 and the arm 72 is deflected upwardly as previously described so as to increase the compressive engagement with the flange and to insure a proper sealing contact therewith. In the fully seated position shown in FIG. 5, the gasket 50 is securely seated and, owning to the resiliency and the nature of the gradually increasing compressive engagement, the flange 100 is mounted in a substantially non-flexed non stressed relationship on the cabinet. The lip portion 76 is a supplemental feature which may prove beneficial in foamed constructions wherein a foam is injected into the space between the liner and the cabinet to provide insulation and additional liner support. Therein, as the foam pressure builds up, the foam acts on the surface 76 by increasing the sealing engagement of the terminal edge thereof against the outer surface of the liner thereby preventing foam from migrating therepast to the exterior of the compartment.

The above noted advantages have been realized using component construction incorporating the following:

|  |  |
|---|---|
| Width of the groove 65 | .25 |
| Thickness of the base section including the barbs | .31 |
| Free width of the groove 84 | .06 |
| Interference of the ledge 86 with the side wall 58 | .06 |
| Length of the root portion 88 | .56 |
| Depth of the groove 84 | .44 |

Although only one form of this invention has been shown and described, other forms will be readily apparent to those skilled in the art. Therefore, it is not intended to limit the scope of this invention by the embodiment selected for purpose of this disclosure but only by the claims which follow.

What is claimed is:

1. A refrigerated cabinet construction comprising: a food liner formed of a thin plastic sheet having side walls and an end wall defining an open ended storage space, said food liner side walls being capable of limited flexure whereby exceeding the limit would subject said side walls to cracking, said side walls terminating at the open end of the storage space with an outwardly turned peripheral flange; an enclosure having outside walls terminating with an inwardly turned peripheral rim having an inner edge circumscribing an area larger than combined area including said open end and said flange; a channel formed integrally with the inner edge of the rim to extend inwardly thereof having spaced surfaces defining a frontally opening groove of a predetermined width, said groove being generally parallel with said outside wall; a liner support gasket formed of an elastomeric material for mounting the food liner on the enclosure without flexure of said food liner, said gasket including a base portion having a free width greater than the width of the groove so as to be resiliently compressively insertable therewithin, said gasket having a slot in an intermediate portion thereof which said slot includes opposed surfaces which are generally perpendicular to said base portion for receiving the flange of the food liner; an outwardly projecting portion of said gasket being resiliently deflected by one of said spaced surfaces upon insertion of said base portion into the channel to narrow the width of the slot such that the opposed surfaces thereof compressively grip the flange without imparting flexure to the side wall.

2. A refrigerated cabinet construction comprising: a food liner formed of a thin plastic sheet having side walls and an end wall defining an open ended storage space, said food liner side walls being capable of limited flexure whereby exceeding the limit would subject said side walls to cracking, said side walls terminating at the open end of the storage space with an outwardly turned peripheral flange of a predetermined thickness and frontal area; an enclosure having outside walls terminating with an inwardly turned peripheral rim having an inner edge circumscribing an area larger than said frontal area; a channel formed integrally with the inner edge of the rim and extending inwardly therefrom, said channel being defined by a first leg substantially parallel to the side walls, a base substantially parallel to the rim, and a second leg spaced inwardly of the first leg and substantially parallel thereto, whereby said base and legs define a groove of predetermined width; a liner support gasket formed of an elastomeric material for mounting the food liner on the enclosure without flexure of said food liner, said gasket including a barbed body having a free width greater than the width of the groove so as to be resiliently compressively insertable therewithin; an arm projecting perpendicularly from the body; a neck generally aligned with the body to extend therefrom adjacent a base of the arm; a head section formed at an end of the neck opposite said body and having an inwardly extending nose section adjacent said arm to define therebetween a slot adapted to receive said food liner flange; and a projecting surface on the head section engaging the first leg upon insertion of the body in the groove to deflect said head section toward said arm to narrow the slot such that the flange is resiliently compressively gripped in assembly therebetween.

3. A refrigerated cabinet construction comprising: a plastic sheet food liner having side walls and an end wall defining an open ended storage space, said food liner side walls being capable of limited flexure whereby exceeding the limit would subject the side walls to cracking, said side walls terminating at the open end with an outwardly turned peripheral flange of a predetermined frontal area; a sheet metal enclosure having outside walls terminating with an inwardly turned rim having an inner edge circumscribing an area larger than said frontal area; a generally J-shaped channel formed integrally with the inner edge of the rim defined by a long leg and a short leg being substantially parallel to each other and said outside wall and a base extending therebetween, said long leg, said short leg and said base defining a groove of predetermined width; a reversely turned lip formed at a terminal edge of the short leg, said lip and short leg defining a surface of a fixed width; a liner support gasket for mounting the food liner on the enclosure without flexure thereof, said gasket including a barbed base section having a free width greater than the predetermined width of the groove so as to be resiliently compressively insertable therewithin; an arm projecting perpendicularly from the base section and terminating with a finger extending in a direction parallel with said base section to define a space therebetween having an undeflected width less than the fixed width of the surface; a neck extending from the base section in alignment therewith; a head section formed at the extended end of the neck and having an inwardly extending nose section defining with said arm a slot adapted to receive said food liner flange with the flange being resiliently compressively gripped in assembly therebetween; and a projecting ledge at the outer edge of said head section being alignable with said long leg so as to be engageable therewith in assembly to downwardly deflect the head section about the neck whereby inserting said base section in said groove after said flange is received within said slot causes deflection of said head section and deflection of said arm as said finger acts on said lip to increase the retaining force of said flange in said slot.

* * * * *

UNITED STATES PATENT AND TRADEMARK OFFICE
CERTIFICATE OF CORRECTION

PATENT NO. : 4,056,211
DATED : November 1, 1977
INVENTOR(S) : Homer Zumwalt

It is certified that error appears in the above-identified patent and that said Letters Patent are hereby corrected as shown below:

Column 4, Line 59, after "the", second occurrence, delete "cainet" and insert --cabinet--.

Column 6, Line 6, delete "saide" and insert --side--.

Signed and Sealed this

Seventh Day of March 1978

[SEAL]

Attest:

RUTH C. MASON
Attesting Officer

LUTRELLE F. PARKER
Acting Commissioner of Patents and Trademarks